(12) United States Patent
Hilliard et al.

(10) Patent No.: US 8,727,017 B2
(45) Date of Patent: May 20, 2014

(54) SYSTEM AND METHOD FOR OBTAINING DATA ON AN UNSTRUCTURED GRID

(75) Inventors: Lucas J. Hilliard, Oslo (NO); Marek K. Czernuszenko, Sugar Land, TX (US); Yao-Chou Cheng, Houston, TX (US); Neal L. Adair, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 468 days.

(21) Appl. No.: 13/031,521

(22) Filed: Feb. 21, 2011

(65) Prior Publication Data

US 2011/0259598 A1 Oct. 27, 2011

Related U.S. Application Data

(60) Provisional application No. 61/326,927, filed on Apr. 22, 2010.

(51) Int. Cl.
*E21B 43/00* (2006.01)

(52) U.S. Cl.
USPC .................. 166/369; 166/250.01; 166/251.1; 703/10

(58) Field of Classification Search
USPC .......... 166/250.01, 254.1, 255.1, 369; 703/10
See application file for complete search history.

(56) References Cited

U.S. PATENT DOCUMENTS

| | | | |
|---|---|---|---|
| 5,740,342 A | 4/1998 | Kocberber | |
| 5,905,657 A | 5/1999 | Celniker | |
| 6,018,497 A * | 1/2000 | Gunasekera | .................. 367/72 |
| 6,035,255 A | 3/2000 | Murphy et al. | |
| 6,044,328 A | 3/2000 | Murphy et al. | |
| 6,070,125 A | 5/2000 | Murphy et al. | |
| 6,106,561 A | 8/2000 | Farmer | |
| 6,236,994 B1 | 5/2001 | Swartz et al. | |
| 6,278,949 B1 | 8/2001 | Alam | |
| 6,373,489 B1 | 4/2002 | Lu et al. | |
| 6,519,568 B1 | 2/2003 | Harvey et al. | |
| 6,549,879 B1 | 4/2003 | Cullick et al. | |
| 6,772,066 B2 | 8/2004 | Cook | |
| 6,826,483 B1 | 11/2004 | Anderson et al. | |
| 6,829,570 B1 | 12/2004 | Thambynayagam et al. | |

(Continued)

FOREIGN PATENT DOCUMENTS

| | | |
|---|---|---|
| CA | 2312381 | 6/1999 |
| EP | 1036341 | 2/2005 |

(Continued)

OTHER PUBLICATIONS

Mukhopadhyay, P.K. (2005), "Three-dimensional Borehole Radar Imaging", Thesis, University of Cape Town, 204 pgs.

(Continued)

*Primary Examiner* — Giovanna Wright
*Assistant Examiner* — Richard Alker
(74) *Attorney, Agent, or Firm* — ExxonMobil Upstream Research Company, Law Dept.

(57) ABSTRACT

There is provided a system and method for obtaining data corresponding to a property of interest on an unstructured grid. An exemplary method comprises defining a path of interest at least a portion of which goes through the unstructured grid. The exemplary method also comprises extracting data corresponding to the property of interest on the unstructured grid where the path of interest and the unstructured grid overlap.

15 Claims, 5 Drawing Sheets

(56) References Cited

U.S. PATENT DOCUMENTS

| | | | |
|---|---|---|---|
| 6,907,392 | B2 | 6/2005 | Bennis et al. |
| 6,980,935 | B2 | 12/2005 | Lu et al. |
| 7,003,439 | B2 | 2/2006 | Aldred et al. |
| 7,027,925 | B2 | 4/2006 | Terentyev et al. |
| 7,031,842 | B1 | 4/2006 | Musat et al. |
| 7,047,165 | B2 | 5/2006 | Balaven et al. |
| 7,047,170 | B2 | 5/2006 | Feldman et al. |
| 7,079,953 | B2 | 7/2006 | Thorne et al. |
| 7,082,387 | B1 | 7/2006 | Wolfe, Jr. |
| 7,203,342 | B2 | 4/2007 | Pedersen |
| 7,260,508 | B2 * | 8/2007 | Lim et al. ............ 703/2 |
| 7,281,213 | B2 | 10/2007 | Callegari |
| 7,337,067 | B2 | 2/2008 | Sanstrom |
| 7,340,385 | B2 * | 3/2008 | James ............... 703/10 |
| 7,366,616 | B2 | 4/2008 | Bennett et al. |
| 7,376,539 | B2 | 5/2008 | Lecomte |
| 7,379,386 | B2 | 5/2008 | Muyzert et al. |
| 7,437,358 | B2 | 10/2008 | Arrouye et al. |
| 7,451,066 | B2 | 11/2008 | Edwards et al. |
| 7,460,957 | B2 | 12/2008 | Prange et al. |
| 7,539,625 | B2 | 5/2009 | Klumpen et al. |
| 7,548,873 | B2 | 6/2009 | Veeningen et al. |
| 7,596,481 | B2 | 9/2009 | Zamora et al. |
| 7,603,264 | B2 | 10/2009 | Zamora et al. |
| 7,606,666 | B2 | 10/2009 | Repin et al. |
| 7,616,213 | B2 | 11/2009 | Chuter |
| 7,617,083 | B2 | 11/2009 | Bennis et al. |
| 7,627,430 | B2 | 12/2009 | Hawtin |
| 7,657,414 | B2 | 2/2010 | Zamora et al. |
| 7,657,494 | B2 | 2/2010 | Wilkinson et al. |
| 7,716,029 | B2 | 5/2010 | Couet et al. |
| 7,725,302 | B2 | 5/2010 | Ayan et al. |
| 7,796,468 | B2 | 9/2010 | Kellogg |
| 7,881,911 | B2 | 2/2011 | Kim et al. |
| 7,913,190 | B2 | 3/2011 | Grimaud et al. |
| 7,925,483 | B2 | 4/2011 | Xia et al. |
| 7,970,545 | B2 | 6/2011 | Sanstrom |
| 7,991,595 | B2 | 8/2011 | Pao et al. |
| 8,073,663 | B2 | 12/2011 | Carruthers et al. |
| 8,094,515 | B2 | 1/2012 | Miller et al. |
| 8,204,727 | B2 | 6/2012 | Dean et al. |
| 8,305,376 | B2 | 11/2012 | Ran et al. |
| 8,325,179 | B2 | 12/2012 | Murray et al. |
| 8,346,695 | B2 | 1/2013 | Pepper et al. |
| 8,364,404 | B2 | 1/2013 | Legendre et al. |
| 2002/0120429 | A1 | 8/2002 | Ortoleva |
| 2004/0268338 | A1 | 12/2004 | Gurpinar et al. |
| 2005/0165555 | A1 | 7/2005 | Jackson |
| 2005/0259101 | A1 | 11/2005 | Westgaard et al. |
| 2006/0020438 | A1 * | 1/2006 | Huh et al. ............ 703/10 |
| 2006/0085174 | A1 | 4/2006 | Hemanthkumar et al. |
| 2007/0156340 | A1 | 7/2007 | Shray et al. |
| 2007/0199721 | A1 | 8/2007 | Givens et al. |
| 2007/0213935 | A1 | 9/2007 | Fagnou et al. |
| 2007/0266082 | A1 | 11/2007 | McConnell et al. |
| 2007/0294034 | A1 | 12/2007 | Bratton et al. |
| 2008/0040084 | A1 * | 2/2008 | Huang ............... 703/7 |
| 2008/0088621 | A1 | 4/2008 | Grimaud et al. |
| 2008/0162093 | A1 | 7/2008 | Nivlet et al. |
| 2008/0165185 | A1 | 7/2008 | Smith et al. |
| 2008/0165186 | A1 | 7/2008 | Lin |
| 2008/0289877 | A1 | 11/2008 | Nikolakis-Mouchas et al. |
| 2008/0297510 | A1 | 12/2008 | Callegari |
| 2008/0306803 | A1 | 12/2008 | Vaal et al. |
| 2009/0027380 | A1 | 1/2009 | Rajan et al. |
| 2009/0027385 | A1 | 1/2009 | Smith |
| 2009/0037114 | A1 | 2/2009 | Peng et al. |
| 2009/0043507 | A1 | 2/2009 | Dommisse et al. |
| 2009/0089028 | A1 | 4/2009 | Sagert et al. |
| 2009/0125362 | A1 | 5/2009 | Reid et al. |
| 2009/0164182 | A1 * | 6/2009 | Pedersen et al. ......... 703/2 |
| 2009/0222742 | A1 | 9/2009 | Pelton et al. |
| 2009/0229819 | A1 | 9/2009 | Repin et al. |
| 2009/0259446 | A1 | 10/2009 | Zhang et al. |
| 2009/0295792 | A1 | 12/2009 | Liu et al. |
| 2009/0299709 | A1 | 12/2009 | Liu |
| 2009/0303233 | A1 | 12/2009 | Lin et al. |
| 2010/0053161 | A1 | 3/2010 | Chuter |
| 2010/0171740 | A1 | 7/2010 | Andersen et al. |
| 2010/0214870 | A1 | 8/2010 | Pepper et al. |
| 2010/0283788 | A1 | 11/2010 | Rothnemer et al. |
| 2011/0029293 | A1 | 2/2011 | Petty et al. |
| 2011/0054857 | A1 | 3/2011 | Moguchaya |
| 2011/0060572 | A1 | 3/2011 | Brown et al. |
| 2011/0074766 | A1 | 3/2011 | Page et al. |
| 2011/0107246 | A1 | 5/2011 | Vik |
| 2011/0115787 | A1 | 5/2011 | Kadlec |
| 2011/0161133 | A1 | 6/2011 | Staveley et al. |

FOREIGN PATENT DOCUMENTS

| | | |
|---|---|---|
| EP | 1230566 | 2/2005 |
| WO | WO 00/14574 | 3/2000 |
| WO | WO 2008020906 A2 * | 2/2008 |
| WO | WO 2008/121950 | 10/2008 |
| WO | WO 2009/039422 | 3/2009 |
| WO | WO 2009/148681 | 12/2009 |
| WO | WO 2011/038221 | 3/2011 |

OTHER PUBLICATIONS

Callahan, S.P. et al. (2005), "Interactive Rendering of Large Unstructured Grids Using Dynamic Level-of-Detail," Visualization, VIS 05, *IEEE*, pp. 199-206.

* cited by examiner

SYSTEM AND METHOD FOR OBTAINING DATA ON AN UNSTRUCTURED GRID

CROSS-REFERENCE TO RELATED APPLICATION

This application claims the benefit of U.S. Provisional Patent Application 61/326,927, filed Apr. 22, 2010, entitled SYSTEM AND METHOD FOR OBTAINING DATA ON AN UNSTRUCTURED GRID, the entirety of which is incorporated by reference herein.

FIELD

The present techniques relate to providing a representation of data corresponding to physical objects using unstructured grids. In particular, an exemplary embodiment of the present techniques relates to extracting data corresponding to one or more properties of interest from an unstructured grid. A visualization of the extracted data may be provided.

BACKGROUND

This section is intended to introduce various aspects of the art, which may be associated with embodiments of the disclosed techniques. This discussion is believed to assist in providing a framework to facilitate a better understanding of particular aspects of the disclosed techniques. Accordingly, it should be understood that this section is to be read in this light, and not necessarily as admissions of prior art.

Three-dimensional (3D) model construction and visualization commonly employs data stored as a structured grid or an unstructured grid. Such model construction and visualization have been widely accepted by numerous disciplines as a mechanism for analyzing, communicating, and comprehending complex 3D relationships. Examples of physical regions that can be subjected to 3D analysis include the earth's subsurface, facility designs and the human body.

With respect to providing visualizations of data regarding a 3D earth model, the current practices generally relate to processing and visualizing the geological data types such as seismic volumes, a geo-modeling grid, fault surfaces, horizon grids, well data and the like. In addition, it may be desirable to visually represent engineering and geoscience data types, which may be point or non-spatial data. Examples of such data types include drilling information, daily/monthly production data, geochemical or geomechanical analysis results, production measurements or the like.

The ability to extract useful information from a complex data model and to display that information is desirable in many fields, including the fields of hydrocarbon exploration and production. Known toolkits provide property extraction support but lack sufficient flexibility. For example, known property extraction toolkits that operate on structured grids and geologic models extract a property value from cells entered by a straight-line path. A known property extraction toolkit provides extraction for an arbitrary input set of points in a structured grid and geologic model. For each point, the value of a cell that contains the point is extracted. The application of this type of property extraction to seismic data is trivial.

Another known property extraction tool that is used with structured grid and geologic models extracts a cell property value for each cell being entered at each intersection point along a straight-line path. Yet another structured grid and geologic model property extraction tool extracts cell values only at input points rather than at intersection points. Known methods used to extract geologic model cell properties are more generic relative to seismic data extraction.

U.S. Pat. No. 7,203,342 relates to a method of extracting desired features from a cellular image. The method includes the step of selecting an initial cell within the image. An additional cell is selected near the initial cell, appearing to be associated with a desired feature. The step of selecting an additional cell is repeated for further cells near at least one of the previously selected cells, appearing to be associated with the feature, until selection termination criteria are satisfied. The previous steps are repeated for other initial cells. The method is alleged to allow the extracting of relatively weakly defined features in relatively noisy images, such as extracting faults or geologic horizons from two-dimensional (2D) or 3D seismic data. A method of editing/filtering the features utilizing a stereo net is also disclosed. Related computer system and computer program products for implementing the method are also described.

U.S. Patent Application Publication No. 2007/0199721 relates to a method for performing oilfield operations for an oilfield having a subterranean formation with an underground reservoir therein. The oilfield may be provided with at least one wellsite with oilfield equipment for extracting fluid from the underground reservoir. The disclosed method relates to collecting data comprising trajectory and earth properties associated with a planned well for a geoscience application to obtain a geoscience model. A well planning system integrated with the geoscience application is invoked and the trajectory and earth properties is extracted from the geoscience model to obtain an extracted trajectory and extracted earth properties. At least one parameter is determined for the planned well based on the extracted trajectory and the extracted earth properties. The at least one parameter is displayed in association with the planned well within a geological context of the geoscience application to allow refinement of the planned well for efficient fluid extraction from the underground reservoir.

U.S. Pat. No. 6,549,879 relates to a systematic, two-stage method for determining well locations in a 3D reservoir model while satisfying various constraints, including: minimum interwell spacing, maximum well length, angular limits for deviated completions, and minimum distance from reservoir and fluid boundaries. In the first stage, the wells are placed assuming that the wells can only be vertical. In the second stage, these vertical wells are examined for optimized horizontal and deviated completions. This is expedient, yet systematic, and it provides a first-pass set of well locations and configurations. The first stage solution formulates the well placement problem as a binary integer programming (BIP) problem which uses a "set-packing" approach that exploits the problem structure, strengthens the optimization formulation, and reduces the problem size. Commercial software packages may be used to solve BIP problems. The second stage sequentially considers the selected vertical completions to determine well trajectories that connect maximum reservoir pay values while honoring configuration constraints including: completion spacing constraints, angular deviation constraints, and maximum length constraints. The parameter to be optimized in both stages is a tortuosity-adjusted reservoir "quality." The quality is preferably a static measure based on a proxy value such as porosity, net pay, permeability, permeability-thickness, or pore volume. These property volumes are generated by techniques of seismic data analysis and interpretation, geology and petrophysical interpretation and mapping, and well testing from existing wells. Also disclosed is an algorithm for calculating the tortuosity-adjusted quality values.

SUMMARY

An exemplary embodiment of the present techniques comprises a method for obtaining data corresponding to a property of interest on an unstructured grid. The method may comprise defining a path of interest at least a portion of which goes through the unstructured grid. The exemplary method also comprises extracting data corresponding to the property of interest on the unstructured grid where the path of interest and the unstructured grid overlap. The method may comprise providing a visualization of the extracted data corresponding to the property of interest.

The path of interest may comprise a well path. The well path may have a curvature defined on it and the curvature may be accounted for by the extraction.

In one exemplary embodiment, the path of interest comprises a polyline. The path of interest may be defined by a set of points, with the extraction being performed at the set of points. In other exemplary embodiments, the extraction takes place at a set of points defined by an overlap between the path of interest and topological elements of the unstructured grid. In another exemplary embodiment, the extraction takes place at both the set of points defining the path of interest and the set of points defined by the overlap of the path of interest and topological elements of the unstructured grid. Extraction may take place at a set of points comprising both the set of points defining the path of interest and the set of points defined by an intersection between the path of interest and topological elements of the unstructured grid.

Extracting data corresponding to a property of interest according to an exemplary embodiment of the present techniques may comprise interpolating a value from a plurality of property values associated with topological elements near the extraction point. Moreover, extracting data may also comprise employing a nearest neighbor algorithm on plurality of property values associated with topological elements near the extraction point.

The data corresponding to the property of interest may comprise a node, face or cell property. Extracting the data corresponding to the property of interest may comprise extracting a value of an intersected face. In addition, extracting the data corresponding to the property of interest may comprise extracting a value corresponding to the cell that contains the extraction point. The definition of the path of interest may be ordered to provide direction.

In one exemplary embodiment, the data corresponding to the property of interest may comprise a property value of a topological element being entered. A NoValue property may be assigned to the data corresponding to the property of interest if the model is being exited. The unstructured grid, path of interest, and/or property of interest may vary over time, with the extraction taking place only where the appropriate times and data overlap.

One exemplary embodiment of the present techniques relates to a computer system that is adapted to obtain data corresponding to a property of interest on an unstructured grid. An exemplary computer system comprises a processor and a tangible, machine-readable storage medium that stores machine-readable instructions for execution by the processor. The machine-readable instructions may comprise code that, when executed by the processor, is adapted to cause the processor to define a path of interest through at least a portion of the unstructured grid. The machine-readable instructions may also comprise code that, when executed by the processor, is adapted to cause the processor to extract data corresponding to the property of interest on the unstructured grid where the path of interest and the unstructured grid overlap. In addition, the tangible, machine-readable storage medium comprises code that, when executed by the processor, is adapted to cause the processor to provide a visualization of the extracted data corresponding to the property of interest. The path of interest may comprise a well path.

A method for producing hydrocarbons from an oil and/or gas field according to an exemplary embodiment of the present techniques relates to using data corresponding to a property of interest of the oil and/or gas field. An exemplary method comprises defining a path of interest through at least a portion of the unstructured grid. Data corresponding to the property of interest is extracted on the unstructured grid where the path of interest and the unstructured grid overlap. Hydrocarbons are extracted from the oil and/or gas field using the data corresponding to the property of interest.

DESCRIPTION OF THE DRAWINGS

Advantages of the present techniques may become apparent upon reviewing the following detailed description and drawings of non-limiting examples of embodiments in which.

DETAILED DESCRIPTION

Figure 1:
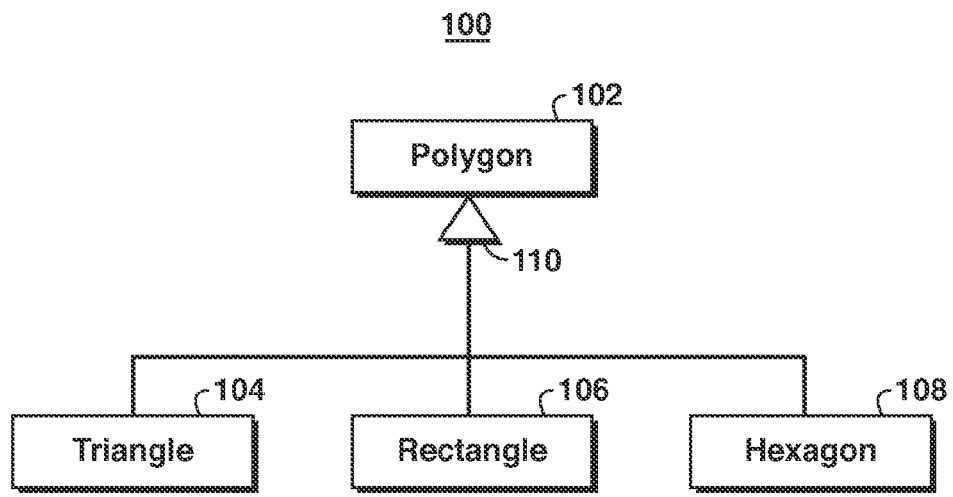
FIG. 1 is a block diagram useful in explaining inheritance in an object-oriented programming environment according to the present techniques.

In the following detailed description section, specific embodiments are described in connection with preferred embodiments. However, to the extent that the following description is specific to a particular embodiment or a particular use, this is intended to be for exemplary purposes only and simply provides a description of the exemplary embodiments.

Accordingly, the present techniques are not limited to embodiments described herein, but rather, it includes all alternatives, modifications, and equivalents falling within the spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

As used herein, the term "cell" refers to a collection of faces, or a collection of nodes that implicitly define faces, where the faces together form a closed volume.

As used herein, the term "class" refers to a data structure that combines state (fields) and actions (methods and other function members) in a single unit. A class provides a definition for dynamically created instances of the class, also known as objects. Classes support inheritance and polymorphism mechanisms whereby derived classes can extend and specialize base classes.

As used herein, the term "computer component" refers to a computer-related entity, either hardware, firmware, software, a combination thereof, or software in execution.

For example, a computer component can be, but is not limited to being, a process running on a processor, a processor, an object, an executable, a thread of execution, a program, and a computer. One or more computer components can reside within a process and/or thread of execution and a computer component can be localized on one computer and/or distributed between two or more computers.

As used herein, the terms "computer-readable medium", "tangible machine-readable medium" or the like refer to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible storage medium or tangible distribution medium and prior art-recognized equivalents and successor media, in which the software implementations embodying the present techniques are stored.

As used herein, the term "encapsulation" refers to a characteristic behavior of an object, which is to hide, or encapsulate, the internal structure of the data of the object and the algorithms by which its functions work. Instead of exposing these implementation details, objects present interfaces that represent their abstracts clearly with no extraneous information. The interface allows only a limited number of interactions between the outside world and an object. In C++ programming, most of these interactions involve invoking methods of the object. By invoking an object's methods, the outside world can tell the object to do something, but the details of how the object performs this action are not visible to the outside world. In effect, the object encapsulates its data and methods and hides them from the outside world.

As used herein, the term "face" refers to an arbitrary collection of points that form a surface.

As used herein, the term "geologic model" refers to a model that is topologically structured in I,J,K space but geometrically varied. A geologic model may be defined in terms of nodes and cells. Geologic models can also be defined via pillars. A geologic model may be visually rendered as a shell (without volume rendering).

As used herein, the term "I,J,K space" refers to a local horizontal reference frame for a geo-cellular model having specified integer coordinates for (i,j,k) for consecutive cells. By convention, K represents a vertical coordinate. I,J,K space may be used as a sample space in which each coordinate represents a single sample value without reference to a physical characteristic.

As used herein, the term "inheritance" refers to a characteristic behavior of an object, which is to allow reuse of pre-existing design and code. Moreover, inheritance allows previously written programs to be broadened by creating new superclasses and subclasses of objects. New objects may be described by how they differ from preexisting objects so that entirely new programs need not be written to handle new types of data or functions. General data and methods belong to a "base" class. More specific classes "inherit" these data and methods and define data and methods of their own. These specific classes are "derived" from the base class.

As used herein, the term "node" refers to a collection of points defining one topological location in I,J,K space. Unless a split or fault condition is associated with the node, nodes have only one point.

The term "object" is used herein in the sense that it is normally understood as a computer science term of art. Thus, "object", refers to a single logical entity that may include a collection of data and methods for processing that data. Some data may be public while other data may be private. Similarly, some methods may be public while other methods may be private. Example methods may include constructors, destructors, get/set methods, and so on. Object-oriented programming (OOP) systems typically contain a large number of objects. An object is said to be an instance of a class of which it is a member. OOP enables objects to model virtually any real-world entity in terms of its characteristics, represented by data, and its behavior, represented by the operations it can perform using the data. In this way, objects can model concrete things like cells in a reservoir simulation and abstract concepts like numbers.

The terms "object-oriented programming" or "OOP" are used herein in the sense that it is normally understood as a computer science term of art. Moreover, the method and model of the present techniques may be implemented using OOP techniques. The most common programming languages for OOP are C, C++, C#, Java or the like. However, the practice of the present techniques is not limited to a particular OOP language. The design of OOP is well known to those skilled in the art of OOP systems and will only be described generally herein. In an object-oriented program, the focus is primarily on data and secondarily on the functions that access that data, rather than being primarily on functions and secondarily on the data they require. In contrast with a program that is described mainly by procedures with data input to and output from each procedure (such as a program written in FORTRAN or COBOL), an object-oriented program is organized around "objects."

As used herein, the term "path dependent objects" refers to data objects generally of one of two classifications: drilling/production information or reservoir/subsurface information. Path dependent objects may be represented as top and bottom measured depth ranges or specific measured depths. Path dependent objects may be visually rendered as cylinders or disks around a wellbore, and do not typically have individual properties.

As used herein, the term "point" refers to an X,Y,Z location in 3D space.

As used herein, the term "pointset" refers to collections of points, such as data points. Pointsets may be used to represent a fault or horizon. Pointsets may be visually rendered as a fixed scene size or as a pixel. Properties may be used to color the points or to change their size.

As used herein, the term "polymorphism" refers to a characteristic behavior of an object, which is to allow a request to be made of a software component without knowing detailed information about the composition of the software component. According to polymorphism, a software component receives a request and interprets it to determine, according to the variables and data of the software component, how to respond to the request.

As used herein, the term "primitive" refers to a basic geometric shape. Examples of 2D primitives include rectangles, circles, ellipses, polygons, points, lines or the like. Examples of 3D primitives include cubes, spheres, ellipsoids, cones, cylinders or the like.

As used herein, the term "property" refers to data representative of a characteristic associated with different topological elements on a per element basis. Generally, a property could be any computing value type, including integer and floating point number types or the like. Moreover, a property may comprise vectors of value types. Properties may only be valid for a subset of a geometry object's elements. Properties may be used to color an object's geometry. The term "property" may also refer to a characteristic or stored information related to an object. Application of the appropriate definition is intuitive to one skilled in the art of computer science.

As used herein, the term "seismic data" refers to a multi-dimensional matrix or grid containing information about points in the subsurface structure of a field, where the information was obtained using seismic methods. Seismic data typically is represented using a structured grid. Seismic attributes or properties are cell- or voxel-based. Seismic data may be volume rendered with opacity or texture mapped on a surface.

As used herein, the term "simulation model" refers to an unstructured grid with collections of points, faces and cells.

As used herein, the term "structured grid" refers to a matrix of volume data points known as voxels. Structured grids are typically used with seismic data volumes or medical imaging.

As used herein, the term "triangulated surface" refers to a collection of points and triangles (the indices of three points in a collection of points). Triangulated surfaces may be visually rendered as surfaces. Properties may be used to color the surface.

As used herein, the term "topological elements" refers to the building blocks of an object. Points, faces, or cells are the most common examples.

As used herein, the term "unstructured grid" refers to a collection of cells with arbitrary geometries. Each cell can have the shape of a prism, hexahedron, or other more complex 3D geometries. When compared to structured grids, unstructured grids can better represent actual data since unstructured grids can contain finer (i.e. smaller) cells in one area with sudden changes in value of a property, and coarser (i.e. larger) cells elsewhere where the value of the property changes more slowly. Finer cells may also be used in areas having more accurate measurements or data certainty (for example, in the vicinity of a well). The flexibility to define cell geometry allows the unstructured grid to represent physical properties better than structured grids. In addition, unstructured grid cells can also better resemble the actual geometries of subsurface layers because cell shape is not restricted to a cube and may be given any orientation. However, all cell geometries need to be stored explicitly, thus an unstructured grid may require a substantial amount of memory. Unstructured grids may be employed in connection with reservoir simulation models. Note that the term unstructured grid relates to how data is defined and does imply that the data itself has no structure. For example, one could represent a seismic model as an unstructured grid with explicitly defined nodes and cells. The result would necessarily be more memory intensive and inefficient to process and visualize than the corresponding structured definition.

As used herein, the term "unstructured surface" refers to a collection of points and polygonal faces. Unstructured surfaces may be visually rendered as surfaces. Properties may be used to color the surface.

As used herein, the terms "visualization engine" or "VE" refer to a computer component that is adapted to present a model and/or visualization of data that represents one or more physical objects.

As used herein, the term "voxel" refers to the smallest data point in a 3D volumetric object. Each voxel has unique set of coordinates and contains one or more data values that represent the properties at that location. Each voxel represents a discrete sampling of a 3D space, similar to the manner in which pixels represent sampling of the 2D space. The location of a voxel can be calculated by knowing the grid origin, unit vectors and the i, j, k indices of the voxel. As voxels are assumed to have similar geometries (such as cube-shaped), the details of the voxel geometries do not need to be stored, thus structured grids require relatively little memory. However, dense sampling may be needed to capture small features, therefore increasing computer memory usage requirements.

As used herein, the term "well" refers to a surface location with a collection of wellbores. Wells may be visually rendered as a point or a glyph, along with a name.

As used herein, the term "wellbore" refers to a constituent underground path of a well and associated collections of path dependent data. A wellbore may be visually rendered as a collection of connected line segments or curves. Wellbores may also be visually rendered cylindrically with a radius.

As used herein, the term "well log" refers to a collection of measured depth and value pairs along a wellbore. Well log data may be visually rendered as coloration along a wellbore or as a separate line segment some distance from the path of the wellbore.

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions using the terms such as "adjusting", "comparing", "computing", "creating", "defining", "determining", "displaying", "extracting", "limiting", "obtaining", "processing", "performing", "predicting", "producing", "providing", "selecting", "storing", "transforming", "updating" or the like, refer to the action and processes of a computer system, or similar electronic computing device, that transforms data represented as physical (electronic) quantities within the computer system's registers and memories into other data similarly represented as physical quantities within the computer system memories or registers or other such information storage, transmission or display devices. Example methods may be better appreciated with reference to flow diagrams.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, it is to be appreciated that various actions could occur concurrently, substantially in parallel, and/or at substantially different points in time.

Exemplary embodiments of the present techniques may provide the ability to interrogate and explore 3D model data that are stored as unstructured grids. The results of this interrogation may be useful to both geoscientist and engineers in the oil and gas industry. Moreover, this interrogation may be particularly desirable in relation to the proximity of planned or drilled wells. Data relating to physical properties of interest retrieved as a result of an interrogation may be displayed as one or more a properties of the path as opposed to filtering or probing the 3D model at or near the path intersections. Further, this extraction and display of the model properties onto a path must be aware of the domain of properties being extracted. For example, when extracting a cell property, a value should be extracted at every model/path intersection and instead of smoothly interpolating between extracted values the property should hold the value of the cell entered until the next intersection. Other combinations of model types and property types employ domain-specific application of the extracted values. Moreover, an exemplary embodiment of the present techniques addresses the need for a 3D model property extraction algorithm that is tailored to the domain of both the 3D Model type and the type of the property being extracted. Exemplary embodiments of the present techniques may provide property extraction and display for models that employ unstructured grids.

As a specific example, embodiments of the present techniques may be employed to provide methods of interrogation/extracting model property for a given well path for purposes of well planning within a 3D earth model. Such methods allow the user to obtain model properties beyond traditional property extraction for 3D geometric models. An exemplary embodiment of the present technique may allow a user to identify properties as accurately and as granularly as the underlying model definitions. In addition, an exemplary embodiment may also allow various configurations of well trajectories, such as straight, constant curved, and/or spline curved section. The productivity of extracting petroleum from reservoirs and drilling performance can thus be enhanced.

An exemplary embodiment of the present techniques relates to a visualization engine or VE that is adapted to model and/or display complex 3D or four-dimensional (4D) data in a useful way. A VE according to an exemplary embodiment of the present techniques may provide the ability to incorporate new and existing 3D and 4D workflows and to visualize results in a common environment. In addition, an exemplary embodiment of the present techniques may provide 3D and/or 4D support for upstream data types in a single modeling and/or visualization environment.

Object-oriented programming may be used to create a VE according to an exemplary embodiment of the present techniques. Accordingly, a brief overview of object oriented programming is set forth herein with respect to FIG. 1 and FIG. 2.

FIG. 1 is a block diagram useful in explaining inheritance in an object-oriented programming environment according to the present techniques. The diagram is generally referred to by the reference number 100.

In the example shown in FIG. 1, inheritance is illustrated using classes that implement three types of polygons. For this example, a polygon can be a triangle, rectangle, or hexagon. Referring to FIG. 1, these three polygons can be implemented using a base class called Polygon 102 and three derived classes called Triangle 104, Rectangle 106, and Hexagon 108. A small triangle 110 in FIG. 1 indicates that the classes below it inherit from the class above it.

As illustrated in FIG. 1, a Polygon 102 can be a Triangle 104, a Rectangle 106, or a Hexagon 108. Regardless of which it is, each object may have associated properties such as an "area" and a "color". Accordingly, the base class Polygon 102 contains data items called area and color. The three derived classes (the Triangle 104, the Rectangle 106, and the Hexagon 108) inherit these data items from the base class, Polygon 102.

Furthermore, methods that are the same for the three derived classes can be in the base class. For example, a base class method can define the data items "area" and "color", allocate memory for them, and initialize them. However, the area computation is different for each of the three types of polygon, so each derived class must provide its own method for this computation. Thus, Triangle 104, Rectangle 106, and Hexagon 108 each override a Polygon method called compute area that performs the operations required to compute its area, whatever these operations are. The outside world then could contain, for example, an array of Polygon objects, of which some are Triangle objects, some are Rectangle objects, and some are Hexagon objects. It could get the area of each of these objects by asking it to compute area. To obtain a particular polygon's area, the outside world would not have to know how it computed its area. In fact, the outside world would not need to know what kind of polygon it was.

Figure 2:
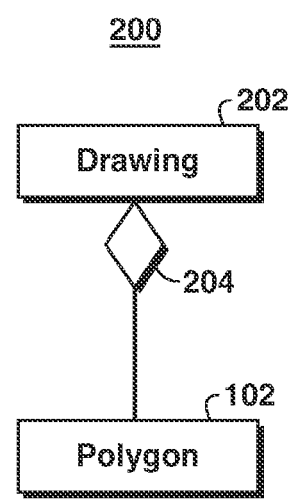
FIG. 2 is a block diagram useful in explaining containment in an object-oriented programming environment according to the present techniques.

FIG. 2 is a block diagram useful in explaining containment in an object-oriented programming environment according to the present techniques. The block diagram is generally referred to by the reference number 200. As shown in FIG. 2, objects in an object-oriented programming environment according to the present techniques may contain other objects or collections of objects. Moreover, a drawing object may contain one or more polygon objects of the class Polygon 102 described above with respect to FIG. 1.

In FIG. 2, a Drawing class 202 aggregates the Polygon class 102. A drawing could be implemented as an object that is an instance of the Drawing class 202. A diamond 204 indicates that an object of one class, Drawing 202, may contain a collection of an undefined number of objects of another class, Polygon 102. The number of Polygon 102 objects allowed would be zero or more, because the Drawing class 202 should not be required to contain a polygon.

For an object, the outside world is the application's higher-level code that uses the object to accomplish its objectives. Encapsulation, polymorphism, and inheritance allow the higher-level code to handle objects that are similar but not identical in type as if they actually were identical in type. This greatly simplifies higher-level code, making it practical to write code that performs more complex operations than are practical with a procedural language.

Figure 3:
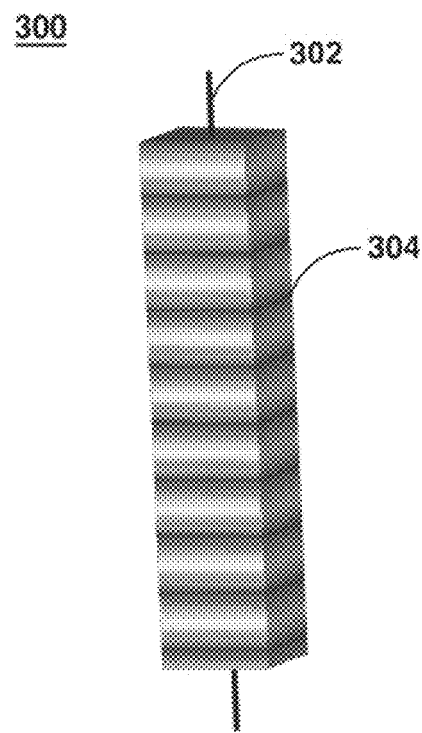
FIG. 3 is a diagram showing a visualization of a physical property model along a well path.

FIG. 3 is a diagram showing a visualization of a physical property model along a well path. The diagram is generally referred to by the reference number 300. A well path 302 is represented as a line in the diagram 300. The well path 302 overlaps a physical property model 304. The physical property model 304, which may comprise an unstructured grid, may correspond to a wide range of physical property data in the vicinity of the well path 302. As described below, an exemplary embodiment of the present techniques performs an interrogation on the data comprising the physical property model 304. As a result, one or more properties of interest may be displayed in conjunction with the well path 302.

Figure 4:
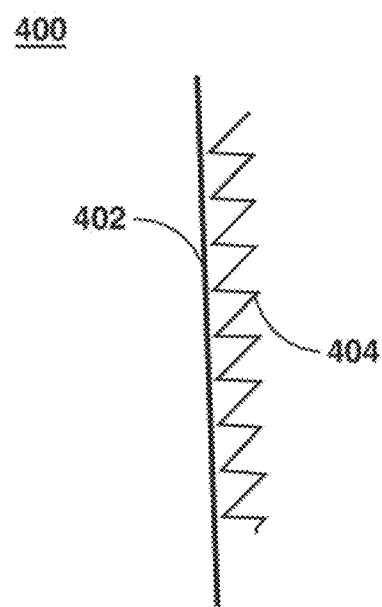
FIG. 4 is a diagram showing a visualization of the results of an interrogation of a physical property model along a well path according to exemplary embodiments of the present techniques.

FIG. 4 is a diagram showing a visualization of the results of an interrogation of a physical property model along a well path according to exemplary embodiments of the present techniques. The diagram is generally referred to by the reference number 400. A well path 402 is represented as a line in the diagram 400. The diagram 400 shows a visual representation 404 of physical property data extracted from the physical property model 304 (FIG. 3) as a result of an interrogation.

According to an exemplary embodiment of the present techniques, property extraction comprises the ability to transfer a 3D model property to another object, such as the well path 402. Moreover, if a 3D physical property model or a portion thereof is penetrated by a path, property extraction may be used to transfer one or more model properties to the path in response to an interrogation. The extracted data corresponding to the model properties of interest may then be treated like any other path property or well log.

In the exemplary visualization shown in FIG. 4, the visual representation 404 of the data representing the property of interest comprises a line whose distance from the well path 402 varies by the value of the property of interest. Those of ordinary skill in the art will appreciate that there are many other ways to render path properties. The specific details of how visualizations of data corresponding to properties of interest are created are not an essential aspect of the present techniques.

Figure 5:
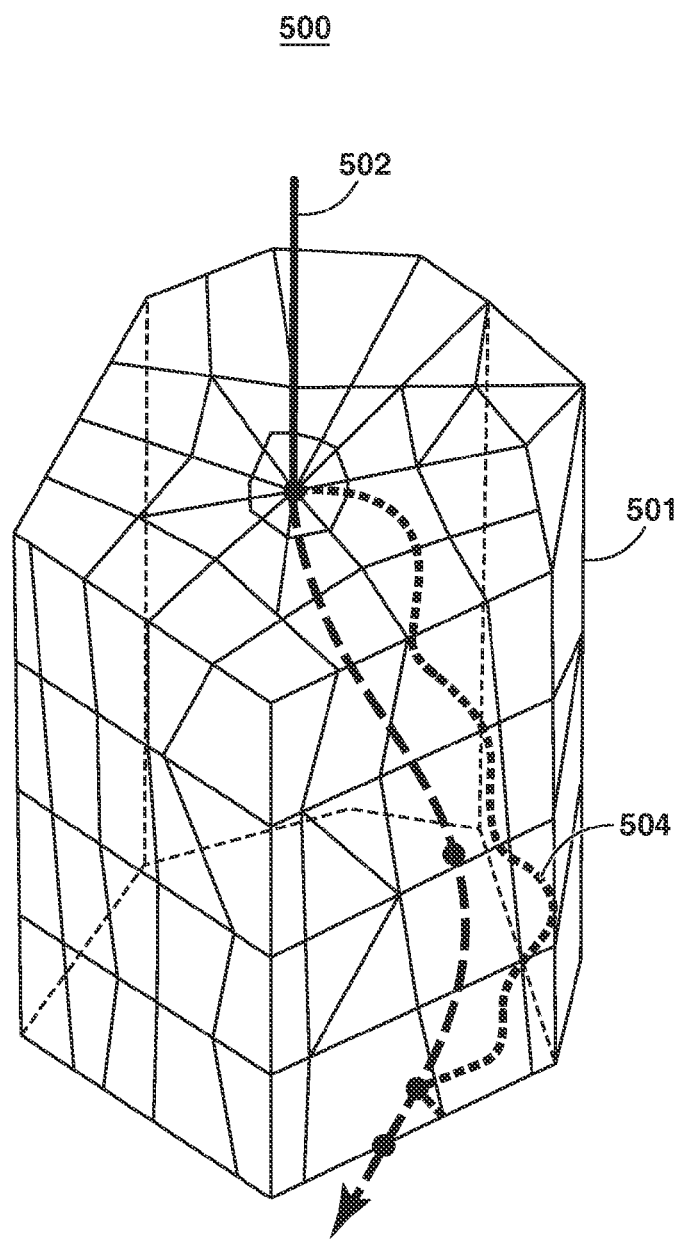
FIG. 5 is a diagram showing a visualization of the results of an interrogation of a physical property model along a well path with physical property model data shown with transparency according to exemplary embodiments of the present techniques.

FIG. 5 is a diagram showing a visualization of the results of an interrogation of a physical property model along a well path with physical property model data shown with transparency according to exemplary embodiments of the present techniques. The diagram is generally referred to by the reference number 500. The diagram 500 shows a transparent representation of an unstructured grid 501 for reference. A well path 502 is represented as a line through the unstructured grid 501. Moreover, the diagram 500 shows a visual representation 504 of physical property data extracted from the physical property model 304 (FIG. 3) as a result of an interrogation.

The unstructured grid 501 is intersected with the well path 502 and extracted property of interest 504 to demonstrate how the extracted data corresponding to the property of interest relates to the physical property model as a whole. Property extraction according to the present techniques provides the ability to interpret the 3D physical property model values exactly where the well path 502 exists as well as simplifying what is rendered in an otherwise complex scene. These results may be used to facilitate well planning and other industry tasks.

Property extraction according to an exemplary embodiment of the present techniques provides a user with flexibility to create useful visualizations of properties of interest. For example, values can be extracted at each intersection of an unstructured grid or at each predefined point. The user can choose to extract an interpolated value or the value of the nearest neighbor or the value of the coincident element. Those of ordinary skill in the art will appreciate that a wide range of interpolation techniques may be applied. Support for node, face, or cell property types may be provided, where applicable. In addition, path curvature may be supported when determining intersection as opposed to relatively simple straight line segments to achieve the best results.

An exemplary embodiment of the present techniques may provide an option to extract values at model intersection points rather than at points along a predefined path. Further, these intersections may be found based on the actual curvature of the path rather than straight-line connections between survey points. This allows for well logs that are very accurate and as granular as the physical property model. Thus, an exemplary embodiment of the present techniques provides accurate results that are easier to interpret for a user. Alternatively, the user may choose to extract the value of physical property model data at each path point.

According to an exemplary embodiment of the present techniques, a user may choose values for a property of interest to extract based on interpolation or a nearest neighbor approach. This selection may be referred to as choosing an extraction type. By way of example, if the user is selecting data for a face property and the extraction is in the interior of a cell of an unstructured grid, the user may select either to extract the value of the nearest face or to extract the interpolated value of all the faces of the cell. Those of ordinary skill in the art will appreciate that there may be multiple ways to interpolate the value that is to be extracted. For example, a weighted average distance from the face centroid may be used. Moreover, the specific interpolation scheme employed in a given situation is a matter of design choice.

Further, the nearest neighbor approach may be commonly determined by the centroid of the topological elements but some other reasonable solution for determining nearest neighbor could be used if needed for a given application. As noted herein, an exemplary embodiment of the present techniques may provide both of these extraction options.

In one exemplary embodiment of the present techniques, flexible model and property types are supported. In particular, an exemplary embodiment of the present techniques supports node, face, and cell properties for unstructured grids.

An exemplary embodiment of the present techniques may provide well-defined extraction behavior for anomalous situations (i.e., corner cases). Moreover, it may be desirable to extract the most appropriate value based on all information available based on given design criteria. Examples of anomalous situations for which extraction behavior may be clearly defined may include extraction behavior when a path for which data is desired travels through a node instead of a face or a path for which data is desired travels coincident with a face.

One exemplary embodiment of the present techniques relates to extracting data from a 3D physical property model such as an earth model. The physical property model desirably includes one or more properties of interest. Locations of interest such as the paths of planned or existing wells may also be included. The user may select previously defined well paths or create a new well path based on, for example, well trajectory creation algorithms.

For each selected well path, one or more properties of interest that are stored in the physical property model may also be selected. The intersection points (P) of the physical property model and selected paths are determined. Associated geometric data elements (GDE) such as cells, nodes, edges and/or faces are identified. For each intersection point P, data values for properties of interest are extracted from the physical property model. In this manner, property values for each point P along an entire defined path such as a well path can be determined based on user-selected algorithms. Examples of user-selected algorithms include average, maximum, nearest or the like.

Because the segments along the path can be determined on the geometric data element of the selected model, the property value of the path segment can also be determined The user can interactively evaluate the results and adjust the selected algorithm parameters, repeating the extraction process if desired.

The following Table 1 provides an exemplary methodology for extracting data corresponding to one or more properties of interest from a physical property model. Input point locations may be derived from pre-existing points or the collection of path model intersection points. In one exemplary embodiment, only the entry and exit intersection points are provided by an intersection algorithm. For example, when the desired input path runs coincident with an edge or face, only the first and last possible intersections may be provided.

The extraction methodology set forth in Table 1 states the heuristics used for various input point locations and property types. The term "input point" refers to a location of a point of interest relative to the topological elements of an unstructured grid corresponding to a physical property model. The extraction guidelines used to retrieve data related to a property of interest are premised on an assumption of the existence of a user-provided extraction frequency, which determines if values should be extracted for each input point or at each intersection. For any cases not explicitly set forth in Table 1, a user-specified interpolation type is used to determine the appropriate value from the narrowest possible set of inputs. Note that Table 1 provides rules for which values should be assigned, in addition to this information, the model data along the path and the X, Y, Z of each point is also provided for each intersection. Extracting a NoValue property indicates that there is no appropriate property value to extract for the given input point or the path is exiting rather than entering the model. A special set of rules may be applied to cell property extraction in situations in which extracting cell properties where the path is going is more important than where it may have come from. The special set of rules may often ignore extraction type in favor of extracting the value of the cell to be entered.

TABLE 1

| Property Type | Input Point Location | Extraction Guideline |
|---|---|---|
| Node | Outside of the model | NoValue extracted |
| Node | Coincident with a model point | Extract the property value of the coincident point ignoring the extraction type |
| Node | Coincident with a model edge (i.e. on the border between two faces) | Extract a property value based on the extraction type using only the model points that comprise that edge |
| Node | Coincident with a model face | Extract a property value based on the extraction type using only the model points that comprise that face |
| Node | Coincident with a model cell | Extract a property value based on the extraction type using only the model points that comprise that cell |
| Face | Outside of the model | NoValue extracted |
| Face | Coincident with a model point | Extract the property value based on the extraction type using only the model faces that require that model point |
| Face | Coincident with a model edge (i.e. on the border between two faces) | Extract the property value based on the extraction type using only the model faces that shared that edge |
| Face | Coincident with a model face | Extract the property value of the coincident face ignoring the extraction type |
| Face | Coincident with a model cell | Extract a property value based on the extraction type using only the model faces that comprise that cell |
| Cell | Outside of the model | NoValue extracted |
| Cell | Coincident with a model point | Extract value based on the following path criteria: If the path enters a cell immediately following the input point, ignore the extraction type and assign the value of the cell being entered. If instead of entering a cell the path leaves the model assign a NoValue. If the path follows an edge or a face, treat as one of the next two cases. |
| Cell | Coincident with a model edge (i.e. on the border between two faces) | Extract value based on the following path criteria: If the path immediately enters a cell that is comprised of the coincident edge ignore extraction type and assign the value of the cell being entered. If the path immediately enters a face that is comprised of the coincident edge, treat as coincident with a model face. In all other cases extract the property value based on the extraction type using only the model cells that comprise that edge |
| Cell | Coincident with a model face | Extract value based on the following path criteria: If the path immediately enters a cell that is comprised of the coincident face ignore extraction type and assign the value of the cell being entered. In all other cases extract the property value based on the extraction type using only the model cells that comprise that face. |
| Cell | Coincident with a model cell | Extract the property value of the coincident cell ignoring the extraction type |

Figure 6:
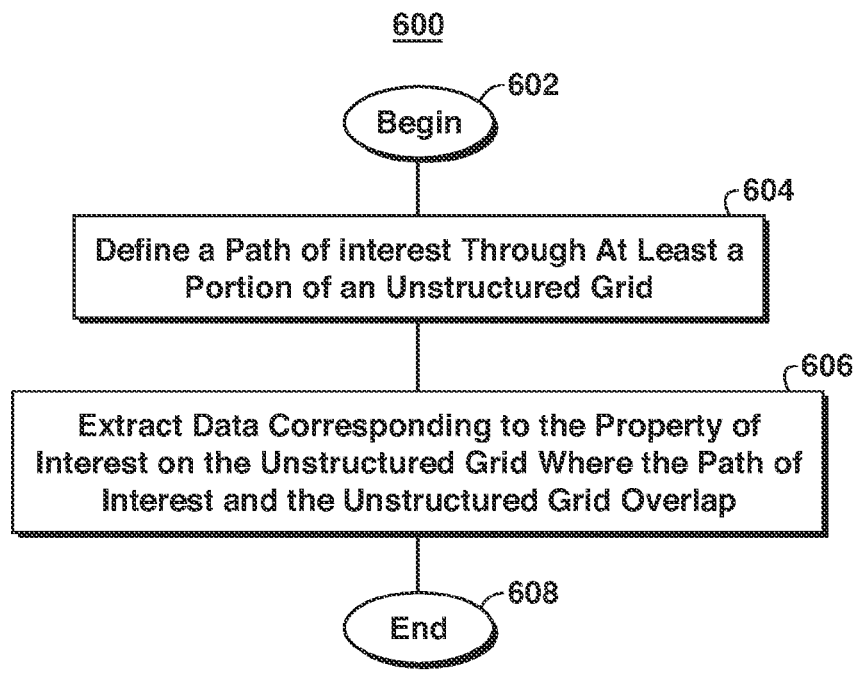
FIG. 6 is a process flow diagram showing a method for obtaining data corresponding to a property of interest on an unstructured grid according to exemplary embodiments of the present techniques.

FIG. 6 is a process flow diagram showing a method for obtaining data corresponding to a property of interest on an unstructured grid according to exemplary embodiments of the present techniques. The process is generally referred to by the reference number 600. The process 600 may be executed using one or more computer components of the type described below with reference to FIG. 8. Such computer components may comprise one or more tangible, machine-readable medium that stores computer-executable instructions. The process 600 begins at block 602.

At block 604, a path of interest is defined through at least a portion of the unstructured grid. Data corresponding to the property of interest on the unstructured grid is extracted where the path of interest and the unstructured grid overlap, as shown at block 606. At block 608, the process ends.

Figure 7:
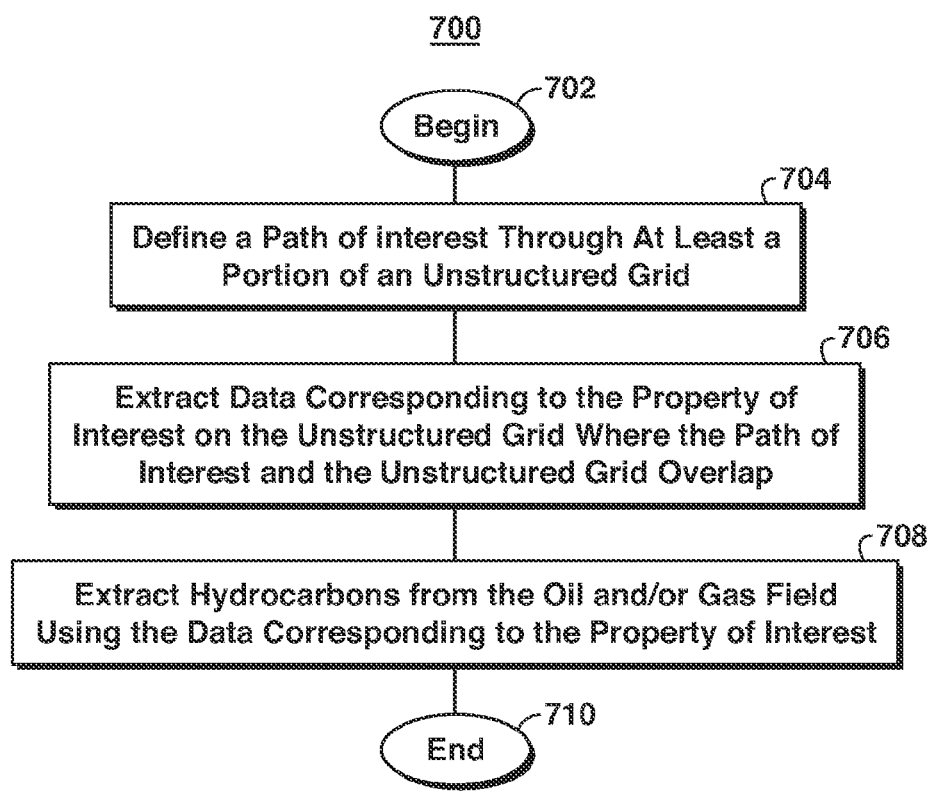
FIG. 7 is a process flow diagram showing a method for producing hydrocarbons from an oil and/or gas field according to exemplary embodiments of the present techniques.

FIG. 7 is a process flow diagram showing a method for producing hydrocarbons from an oil and/or gas field according to exemplary embodiments of the present techniques. The process is generally referred to by the reference number 700. The process 700 employs exemplary embodiments set forth herein for obtaining data corresponding to a property of interest on an unstructured grid. Those of ordinary skill in the art will appreciate that a VE according to the present techniques may facilitate the production of hydrocarbons by producing time-based models and/or visualizations that allow geologists, engineers and the like to determine a course of action to take to enhance hydrocarbon production from a subsurface region. By way of example, a 3D or 4D visualization produced according to an exemplary embodiment of the present techniques may allow an engineer or geologist to determine well properties in case of a fracture near a wellbore. The visualization and underlying physical property model data may be used to increase production of hydrocarbons from a subsurface region. At block 702, the process begins.

At block 704, a path of interest is defined through at least a portion of the unstructured grid. Data corresponding to the property of interest is extracted on the unstructured grid where the path of interest and the unstructured grid overlap, as shown at block 706. At block 708, hydrocarbons are extracted from the oil and/or gas field using the data corresponding to the property of interest. The process ends, as shown at block 710.

Figure 8:
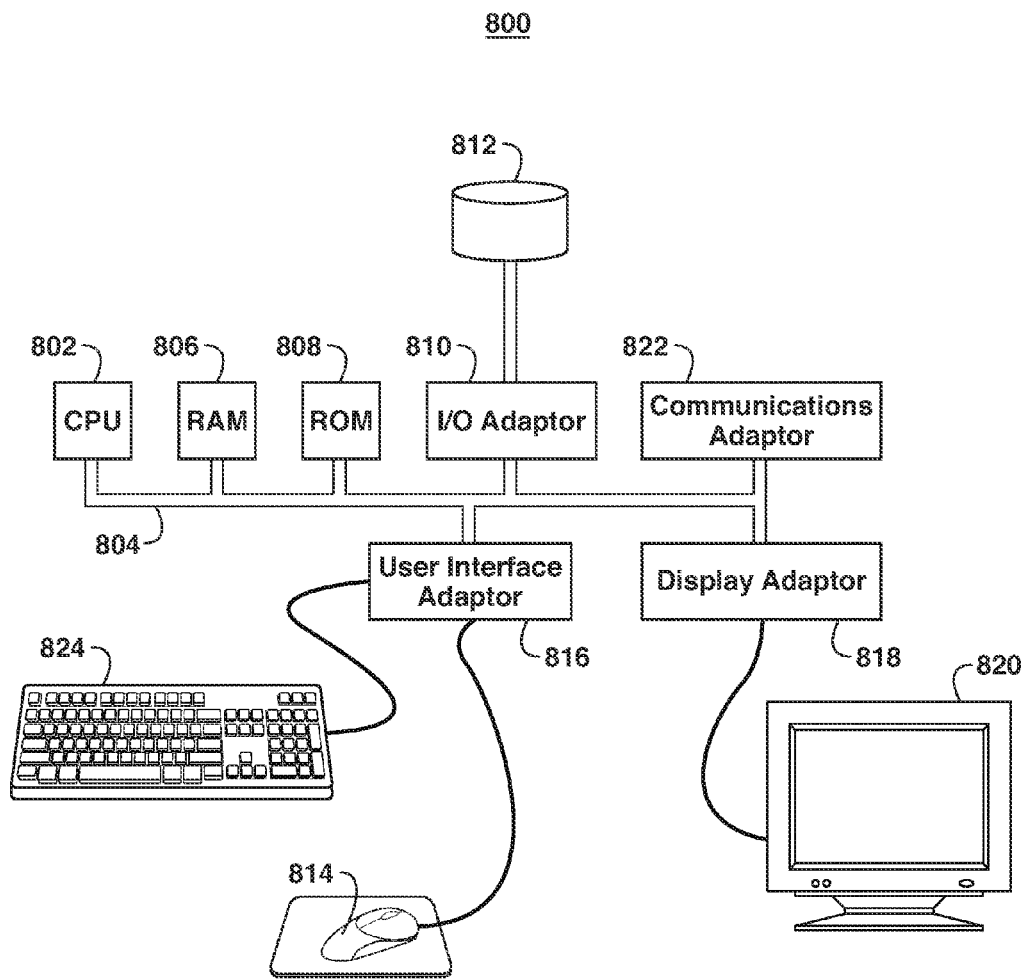
FIG. 8 is a block diagram of a computer system that may be used to perform a method for obtaining a model of data describing a physical structure according to exemplary embodiments of the present techniques.

FIG. 8 is a block diagram of a computer system that may be used to perform a method for obtaining data corresponding to a property of interest on an unstructured grid according to exemplary embodiments of the present techniques. A central processing unit (CPU) 802 is coupled to system bus 804. The CPU 802 may be any general-purpose CPU, although other types of architectures of CPU 802 (or other components of exemplary system 800) may be used as long as CPU 802 (and other components of system 800) supports the inventive operations as described herein. Those of ordinary skill in the art will appreciate that, while only a single CPU 802 is shown in FIG. 8, additional CPUs may be present. Moreover, the computer system 800 may comprise a networked, multi-processor computer system. The CPU 802 may execute the various logical instructions according to various exemplary embodiments. For example, the CPU 802 may execute machine-level instructions for performing processing according to the operational flow described above in conjunction with FIG. 6 or FIG. 7.

The computer system 800 may also include computer components such as computer-readable media. Examples of computer-readable media include a random access memory (RAM) 806, which may be SRAM, DRAM, SDRAM, or the like. The computer system 800 may also include additional computer-readable media such as a read-only memory (ROM) 808, which may be PROM, EPROM, EEPROM, or the like. RAM 806 and ROM 808 hold user and system data and programs, as is known in the art. The computer system 800 may also include an input/output (I/O) adapter 810, a communications adapter 822, a user interface adapter 816, and a display adapter 818. In an exemplary embodiment of the present techniques, the display adapted 818 may be adapted to provide a 3D representation of a 3D earth model. Moreover, an exemplary embodiment of the display adapter 818 may comprise a visualization engine or VE that is adapted to provide a visualization of extracted data. The I/O adapter 810, the user interface adapter 816, and/or communications adapter 822 may, in certain embodiments, enable a user to interact with computer system 800 in order to input information.

The I/O adapter 810 preferably connects a storage device (s) 812, such as one or more of hard drive, compact disc (CD) drive, floppy disk drive, tape drive, etc. to computer system 800. The storage device(s) may be used when RAM 806 is insufficient for the memory requirements associated with storing data for operations of embodiments of the present techniques. The data storage of the computer system 800 may be used for storing information and/or other data used or generated as disclosed herein. User interface adapter 816 couples user input devices, such as a keyboard 824, a pointing device 814 and/or output devices to the computer system 800. The display adapter 818 is driven by the CPU 802 to control the display on a display device 820 to, for example, display information or a representation pertaining to a portion of a subsurface region under analysis, such as displaying a generated 4D visual representation of a target area, according to certain exemplary embodiments.

The architecture of system 800 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

In an exemplary embodiment of the present techniques, input data to the computer system 800 may comprise geologic and geophysical data models such as seismic volumes, geological models and reservoir models. Input data may additionally comprise engineering data, such as drilled well paths and/or planned well paths. Computational implementations according to exemplary embodiments of the present techniques may comprise connections and/or access to computational implementations of processes to model and investigate the engineering and reservoir model properties and path creation method. Relevant connections may include facilities to perform geological model analysis, reservoir simulation, engineering analysis or the like.

The present techniques may be susceptible to various modifications and alternative forms, and the exemplary embodiments discussed above have been shown only by way of example. However, the present techniques are not intended to be limited to the particular embodiments disclosed herein. Indeed, the present techniques include all alternatives, modifications, and equivalents falling within the spirit and scope of the appended claims.

What is claimed is:

1. A method for creating a well log corresponding to a property of interest on an unstructured grid, the method comprising:
    defining, with a computer, a wellbore, at least a portion of which goes through the unstructured grid; and
    creating, with the computer, the well log by extracting data corresponding to the property of interest on the unstructured grid at a set of points defined by each intersection between the wellbore and topological elements of the unstructured grid.

2. The method recited in claim 1, comprising providing a visualization of the well log corresponding to the property of interest.

3. The method recited in claim 1, wherein the wellbore has a curvature defined on it and the curvature is accounted for by the extraction.

4. The method recited in claim 1, wherein the extracting comprises interpolating a value from a plurality of property values associated with topological elements near an extraction point.

5. The method recited in claim 1, wherein the extracting comprises employing a nearest neighbor algorithm on a plurality of property values associated with topological elements near an extraction point.

6. The method recited in claim 1, wherein the data corresponding to the property of interest comprises a node, face, or cell property.

7. The method recited in claim 1, wherein extracting the data corresponding to the property of interest comprises extracting a value of an intersected face.

8. The method recited in claim 1, wherein the extracting comprises extracting a value corresponding to a cell that contains an extraction point.

9. The method recited in claim 1 wherein defining the wellbore comprises providing a direction of the wellbore.

10. The method recited in claim 9, wherein the data corresponding to the property of interest comprises a property value of the topological element being entered.

11. The method recited in claim 9, comprising assigning NoValue to the data corresponding to the property of interest if a model is being exited.

12. The method recited in claim 1 wherein at least one of the unstructured grid, the wellbore, or the property of interest vary over time and the extracting takes place only where appropriate times and data overlap.

13. A computer system that is adapted to create a well log corresponding to a property of interest on an unstructured grid, the computer system comprising:
a processor; and
a tangible, machine-readable storage medium that stores machine-readable instructions for execution by the processor, the machine-readable instructions comprising:
code that, when executed by the processor, is adapted to cause the processor to define a wellbore, at least a portion of which goes through the unstructured grid; and
code that, when executed by the processor, is adapted to cause the processor to create the well log by extracting data corresponding to the property of interest on the unstructured grid at a set of points defined by each intersection between the wellbore and topological elements of the unstructured grid.

14. The computer system recited in claim 13, wherein the tangible, machine-readable storage medium comprises code that, when executed by the processor, is adapted to cause the processor to provide a visualization of the well log corresponding to the property of interest.

15. A method for producing hydrocarbons from an oil and/or gas field using data corresponding to a property of interest of the oil and/or gas field, the method comprising:
defining, with a computer, a wellbore, at least a portion of which goes through an unstructured grid;
creating, with the computer, a well log by extracting data corresponding to the property of interest on the unstructured grid at a set of points defined by each intersection between the wellbore and topological elements of the unstructured grid; and
extracting hydrocarbons from the oil and/or gas field using the well log.

* * * * *